Figure 1:
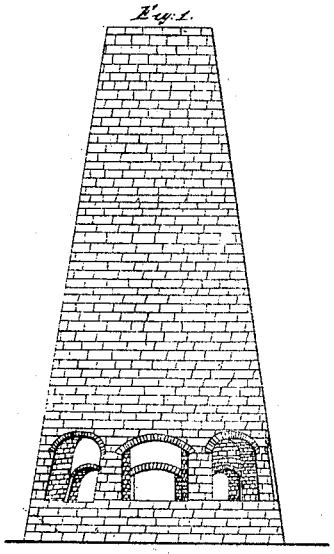
Figure 4:
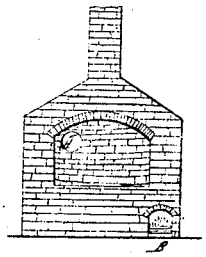
Figure 3:
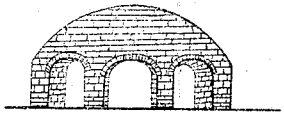
Figure 2:
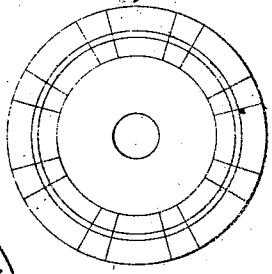
Figure 6:
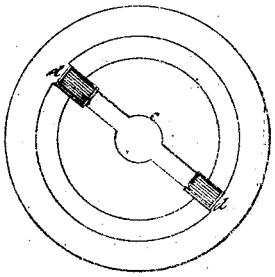
Figure 2:
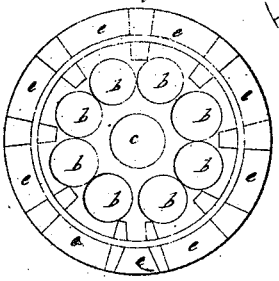
Figure 1:
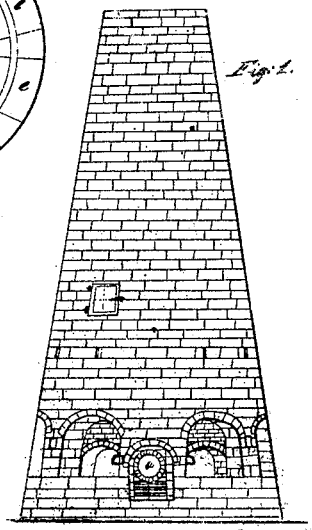
Figure 3:
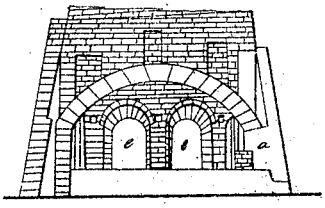
Figure 4:
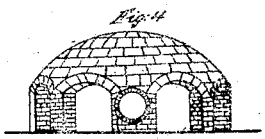

4226X

N. Stanford.

Glass Furnace.

No. 4,226 x.

Patented Oct. 5, 1825.

Sheet 2.

MISSING PAGE TEMPORARY NOTICE

PATENT # 4226X FOR ISSUE DATE 10-5-1825

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text